Nov. 20, 1962  R. R. FREELAND  3,065,417
TESTING INSTRUMENT
Filed Dec. 11, 1957
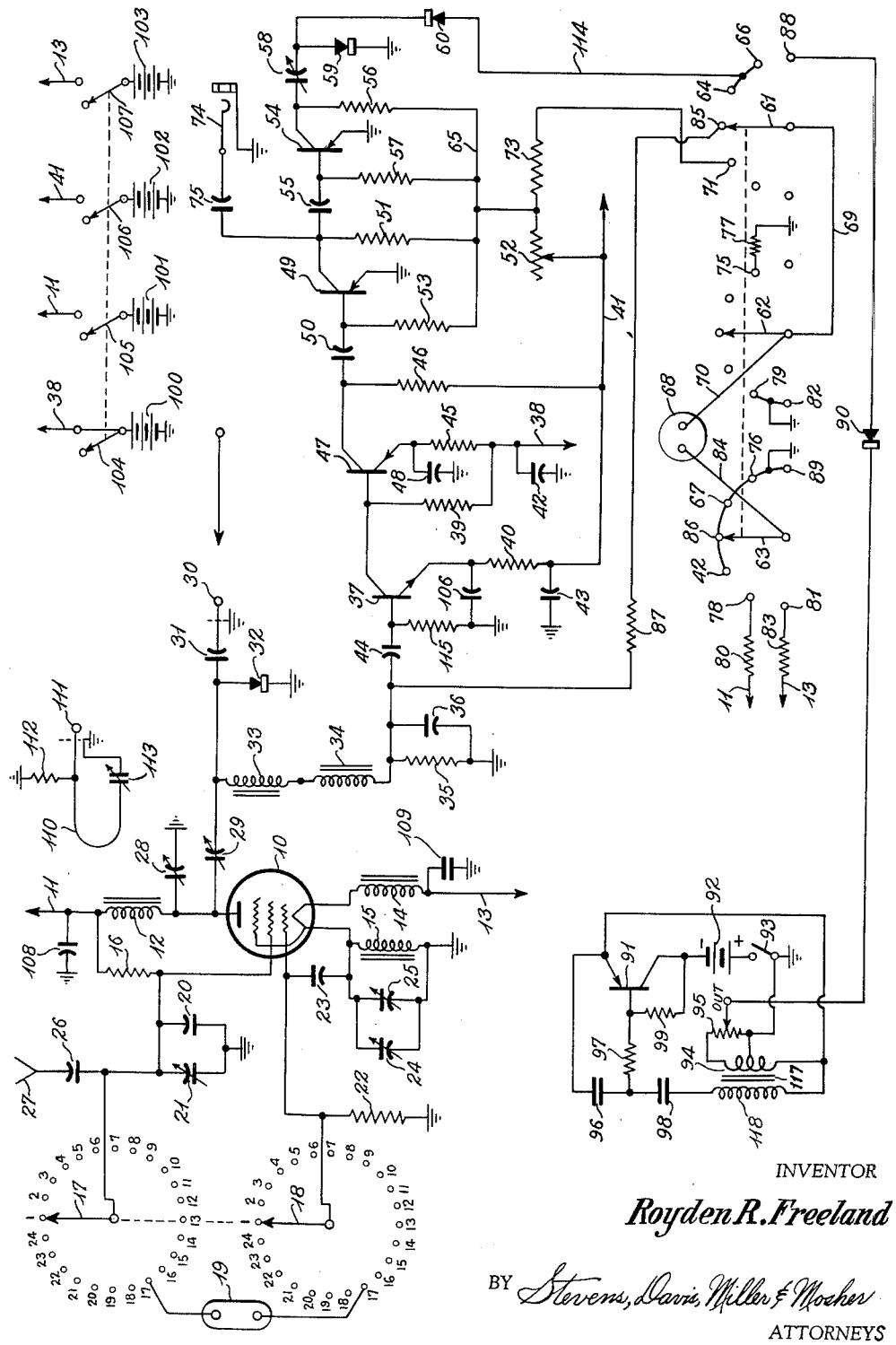
INVENTOR
*Royden R. Freeland*
BY *Stevens, Davis, Miller & Mosher*
ATTORNEYS

United States Patent Office 3,065,417
Patented Nov. 20, 1962

3,065,417
TESTING INSTRUMENT
Royden R. Freeland, Oklahoma City, Okla., assignor to International Crystal Manufacturing Company, Oklahoma City, Okla., a corporation of Oklahoma
Filed Dec. 11, 1957, Ser. No. 702,099
1 Claim. (Cl. 324—79)

This invention relates to a completely portable instrument designed for the testing and adjustment of mobile and base station transmitters and receivers at a frequency between 25 and 470 megacycles.

When operated as a frequency meter, the instrument, according to the present invention, measures exactly in kilocycles the transmitter frequency error and the direction of the error. When operated as an RF and IF signal generator the instrument provides an accurate frequency source for the alignment of receivers and when operated as an AF signal generator it provides a steady tone of about 1000 cycles per second for the adjustment of transmitter deviation.

The instrument develops an accurate standard frequency signal to which the transmitter signal can be compared. This same standard signal is also used to be applied to the associated receivers, thereby assuring an accurate frequency adjustment of all parts of the communication systems. The standard frequency originates in a crystal oscillator. Up to 24 crystals may be inserted into the meter for the selection of the frequencies required for testing of the system of transmitters and receivers. The frequencies can be those of the radio frequency channels of operation or of the intermediate frequencies of the receivers. The standard frequency is combined with the transmitter frequency in a mixer circuit and the resulting beat frequency is applied to a pulse rate counter circuit, which produces direct current output whose amplitude is directly proportional to the input beat frequency. This direct current output is applied to a microammeter which is calibrated to read the difference frequency directly in kilocycles.

The instrument is self-contained in a small portable case. Being completely battery operated, it can be used anywhere for field testing and adjusting of receivers and transmitters. The instrument utilizes transisters and thereby has a very low battery drain. The oscillator circuit employs a vacuum tube which has a fast warm-up time, and the off-on power switch is of the spring return type, always returning to the off position when not in use. This results in a very long life for the batteries used.

The objects and the advantages can be better understood with reference to the single figure of the drawings which show a circuit diagram of the test instrument.

Power is supplied to the circuit from the batteries 100 through 103 of plus 9 volts, plus 67½ volts, minus 9 volts, and plus 1.5 volts respectively.

The power switch, comprising the mechanically coupled switch arms 104 through 107, connects the batteries 100 through 103 to lines 38, 11, 41, and 13 respectively. The power switch is biased to an open position so that the voltage supply is only applied to the circuit when the power switch is held closed. The leads 38, 11, 41, and 13 are each connected to ground by 0.005 microfarad capacitors 42, 108, 43, and 109 to reduce arcing on opening of the power switch. These capacitors are shown where to power source lines connect with the circuitry.

The oscillator circuit comprises a vacuum tube 10 whose plate voltage supply is applied from the 67½ volts on line 11 over the iron core inductor coil 12. The 1.5 volts on line 13 is connected over an inductor 14 to one terminal of the cathode heater. The other terminal of the cathode heater is connected to ground over an inductor 15. The heater current for the cathode flows from line 13 through these inductors, which are both 2.2 microhenries. The suppressor grid of the tube 10 is connected directly to the cathode and the screen grid is biased by being connected to the line 11 over a 47 kilohm resistor 16. The potential variation of the screen grid due to the screen grid current is used as the feed back voltage to produce the oscillation. This grid is accordingly connected directly to one selector arm 17 of the crystal selector switch. The crystal selector switch has two arms, 17 and 18, which are mechanically coupled to move in unison. The crystal selector switch has 24 positions and connects a different crystal into the feed back loop of the oscillator circuit in each of the 24 positions. Only one of the crystals 19 has been illustrated to simplify the drawing. Each of the other 23 crystals are similarly connected from the like positions of the two switch arms 17 and 18. The switch arm 18 is directly connected to the control grid of the pentode 10 thus completing the feed back path. The control grid is connected to ground over the megohm resistor 22, and to the cathode over the capacitor 23. A pair of parallel connected variable capacitors 24 and 25 are connected across the inductor 15 and serve to slightly adjust the frequency of oscillation for a purpose to be explained below. The screen grid of the tube 10 is connected to the ground over the parallel circuit of the capacitors 20 and 21. The capacitor 21 is variable for use in factory adjustment of the oscillator circuit to exactly correlate the oscillator. With a given crystal each oscillator circuit is set so that the crystal is on exact frequency at the mid-setting of the frequency adjustment capacitors 24 and 25. The capacitor 21 will help compensate for any variations between production models.

The screen grid is also connected to an output jack 27 over the 2.2 microfarad capacitor 26. The output jack 27 is the output terminal for the IF signal, which is used for testing receivers. The plate of the tube 10 is connected to ground over a variable capacitor 28. This capacitor in conjunction with the iron core coil 12, tunes the plate circuit of the oscillator to the second harmonic of the selected crystal. The crystal is tuned in each case until the second harmonic is peaked so that the second harmonic of the crystal is injected into the mixer circuit.

A loop 110 is positioned so that the frequency from the oscillator is induced therein. One terminal of this loop is directly connected to an output terminal 111 and over a 52 ohm resistor 112 to ground. The 3 to 15 microfarad variable capacitor 113 connects the other terminal of the loop to ground. This circuitry provides a low voltage output of the RF signal from the oscillator for alignment purposes. The capacitor 113 is variable so that the attenuation of the RF signal due to the capacitor can be controlled and thereby the amplitude of the signal available from the output terminal 111 can be controlled.

The output from the oscillator circuit is taken from the plate of the tube 10 and applied to the mixer circuit over the variable capacitor 29, which serves to isolate the mixer circuit from the oscillator circuit. This capacitor is variable so that the amplitude injection voltage to the mixer circuit from the oscillator can be controlled. The transmitter frequency to be measured is applied to the mixer circuit from terminal 30 over the 4.7 microfarad capacitor 31. The terminal 30 is also used as an output terminal for high voltage RF signal generated by the oscillator for receiver adjustment.

The combined signal of the transmitter frequency and the oscillator frequency is rectified by the diode 32 which shunts the positive half cycles of the signal to ground leaving only the negative half cycles, thus, effecting a mixing operation and producing an audio beat frequency. This beat frequency is applied to the pulse rate counter circuit over the 0.5 microhenry and 1.0 millihenry inductors 33 and 34, which serve to isolate the mixer circuit from the audio portion of the instrument, and a capacitor 44. The input to the capacitor 44 is connected to ground over the parallel circut of the 18 kilohm resistor 35 and the 100 microfarad capacitor 36. The capacitor 36 by passes the RF frequency around the resistor 35 so that only the audio beat frequency is applied to the capacitor 44 and the pulse rate counter circuit. The pulse rate counter circuit produces a direct current output on line 114 which has an amplitude proportional to the input beat frequency to the pulse rate counter circuit.

When the test instrument is to be operated as a frequency meter or a deviation meter the direct current output on line 114 is connected to a microammeter 68, by a meter control switch. The meter control switch comprises three switch arms 61 through 63 which are mechanically coupled to move in unison. The positive terminal of the ammeter 68 is connected to the switch arm 63 by the conductor 84. The negative terminal of the ammeter is connected to the switch arm 62 by the conductor 70. The switch arm 62 is connected to the switch arm 61 by the conductor 69. The direct current output on line 114 is connected to terminals 64 and 66, which are two switch positions of the switch arm 61. When the meter control switch is operated so that the switch arm 61 contacts the terminal 64, the switch arm 63 will contact a terminal 67 and the switch arm 62 will contact an unconnected terminal. With the meter control switch in this position, the direct current output from the pulse rate counter circuit on line 114 will be connected to the microammeter 68. The direct current output on line 114 will flow over switch arm 61, the lead 69, and the lead 70, through the meter 68 over the lead 71 and the switch arm 63 to the terminal 67 from there to ground. The microammeter 68 will indicate by its deflection the amount of direct current flowing from line 114. Since the direct current output on line 114 is proportional to the frequency applied to the pulse rate circuit, the deflection of the meter 68 will indicate the beat frequency applied to the pulse rate counter and hence the difference between the input frequency to the instrument and the oscillator frequency. The exact frequency of the input can then be determined by trimming the oscillator frequency by means of the variable capacitors 24 and 25. This operation will indicate whether the oscillator frequency is higher or lower than the input frequency and thus the input frequency can be determined.

When the meter control switch is operated so that the switch arm 61 contacts the terminal 66, the switch arm 62 will contact a terminal 75 which is connected to ground over a 750 ohm resistor 77, and the switch arm 63 will contact a terminal 76, which is connected to ground. The meter 68 will then be connected to the direct current output on line 114 but will be shunted by the resistor 77. This position of the meter control switch provides a scale multiplication of 3 by shunting ⅔ of the direct current output from line 114 around the meter 68.

With the meter control switch operated so that the switch arm 63 contacts a terminal 78, the switch arm 62 will contact a terminal 79, which is connected to ground, and the switch arm 61 will contact an unconnected terminal. The meter 68 will then be connected over a megohm resistor 80 to the positive 67½ volt power supply applied to line 11 by the power switch. These 67½ volts will then cause current to flow through the microammeter 68 to ground and the resulting deflection of the microammeter provides a test for the 67½ volt battery 101. With the meter control switch operated so that the switch arm 63 contacts a terminal 81, the switch arm 62 will contact a terminal 82, which is connected to ground, and the switch arm 61 will contact an unconnected terminal. The terminal 81 is connected over a 22 kilohm resistor 83 to the plus 1.5 volt supply applied to lead 13 by the power switch. The 1.5 volt supply will cause current to flow through the microammeter to ground with the meter control switch in this position. The resulting deflection provides a test of the 1.5 volt battery 103.

When the meter control switch is operated so that the switch arm 61 contacts a terminal 88, the switch arm 62 will contact an unconnected terminal and the switch arm 63 will contact terminal 89, which is connected to ground. The terminal 88 is connected to the output of an audio oscillator over a rectifier 90. The audio oscillator is used to provide a steady tone to modulate the transmitter when measuring deviation. The standards call for 1.5 R.M.S. voltage to be fed to the transmitter and this value can be predetermined by measuring the amplitude of the output of the audio oscillator. With the meter control switch in this position, the microammeter 68 provides this measurement. The rectifier 90 rectifies the output from the audio oscillator and provides the D.C. voltage to be applied to the microammeter. When a full deflection of the meter 68 is obtained, the output from the audio oscillator will be 1.5 R.M.S.

When the meter control switch is operated so that the switch arm 61 contacts terminal 71, the switch arm 62 will contact an unconnected terminal and the switch arm 63 will contact terminal 72, which is connected to ground. With the meter control switch in this position, the deflection of the meter 68 will indicate the D.C. voltage on line 65, which supplies power to the last two stages of the pulse rate counter circuit. The D.C. voltage on line 65 is applied from the line 41 over a potentiometer 52, which is connected as a variable resistance. This position of the meter control switch is used to check whether a given voltage is being applied to the last two stages of the pulse rate circuit. The voltage on line 65 is adjusted by means of the potentiometer 52 until a predetermined deflection of the meter 68 is obtained. This deflection is indicated by a mark on the ammeter and this insures that the proper voltage is being applied from line 65 and that the error in the frequency read by the meter will be within limits.

With the meter control switch operated so that the switch arm 61 contacts a terminal 85 the switch arm 62 will contact an unconnected terminal and the switch arm 63 will contact terminal 86, which is connected to ground. The terminal 85 is connected over resistor 87 to the junction of inductor 34 and capacitor 44, which comprises the input of the pulse rate counter circuit. This switch position is used to determine the amplitude of the signal being applied to the frequency meter and also to adjust the harmonic output of the standard oscillator to peak the second harmonic of the selected crystal. With the power switch off, the only D.C. current applied to the microammeter over terminal 85 will be that due to the rectified D.C. voltage of the applied signal at the rectifier 32. This D.C. voltage will result in current flowing through the inductors 33 and 34, over the resistor 87, the switch arm 61, and the conductor 69, and the conductor 70, through meter 68, and over conductor 84 and the switch arm 63 to ground. The resulting deflection of the meter 68 will indicate the D.C. level of the mixer output and thereby the amplitude of the applied signal, whose frequency is to be measured. To peak the second harmonic of the selected crystal the power switch is turned on and the capacitor 28 is adjusted. When the second harmonic is peaked, the output from the oscillator to the mixer will be a maximum. The D.C. voltage produced by this signal in the mixer will also be a maximum. With the meter control switch operated so that the arms 61 and 63 contact terminals 85 and 86 respectively, the maximum deflection of the meter 68 will indicate precisely the proper adjustment of the capacitor 28 to peak the second harmonic.

The pulse rate counter circuit comprises 4 transistor stages of amplifier limiters. The first stage comprises an N-P-N transistor 37. The output from the mixer is applied over the capacitor 44 and the inductors 33 and 34 to the base of this transistor. The base is connected to ground over a 100 kilohm resistor 115. Voltage is applied over a 22 kilohm resistor 39 to the collector of this transistor from the plus 9 volts on line 38 and over a 27 kilohm resistor 40 to the emitter from the minus 9 volts on line 41. The emitter is connected to ground by a 5 microfarad capacitor 116. The signal applied to the base of the transistor 37 will produce a signal at the collector of this transistor. This signal on the collector of the transistor 37 is applied to the second stage, which comprises a P-N-P transistor 47. The input from the first stage is applied to the base of the transistor 47.

Voltage is applied to the collector of this transistor over a 10 kilohm resistor 46 from the minus 9 volts on line 41 and to the emitter over a 10 kilohm resistor 45 from the plus 9 volts on line 38. The base is also connected to the plus 9 volts on line 38 over the 22 kilohm resistor 39. The emitter is connected to ground over a 5 microfarad capacitor 48. The input signal on the base will produce a corresponding signal on the collector. This signal on the collector of transistor 47 is applied over a 0.1 microfarad capacitor 50 to the base of a P-N-P transistor 49, which comprises the third stage of the pulse rate counter circuit. Voltage is applied to the collector of the transistor 49 from the supply on line 65 over a 12 kilohm resistor 51. The base of the transistor 49 is also connected to line 65 over the 100 kilohm resistor 53. The emitter is connected to ground. The transistor 49 produces an output signal at its collector in response to the input signal being applied at the base. This output signal is applied over a 0.1 microfarad capacitor 55 to the base of the P-N-P transistor 54, and which comprises the fourth final stage of the pulse rate counter circuit. Voltage is supplied to the collector of the transistor 54 from line 65 over the 3.3 kilohm resistor 56. The emitter of this transistor to ground. The base of the transistor 54 is connected to line 65 over a 47 kilohm resistor 57. The signal applied at the base of the transistor 54 produces an output signal at the collector of this transistor. Each of the four stages are connected as amplifiers and produce amplified signals on the collectors of their respective transistors in response to a signal being applied to the base. The amplitude of the signal produced at each collector is limited by the cut-off and saturation points of the transistors and the circuit is designed so that the signal produced on the collector of transistor 54 of the last stage is virtually a square wave having the above mentioned cut-off points defining a fixed amplitude for the square wave. This square wave signal is transmitted through the variable capacitor 58 to the rectifiers 59 and 60. The capacitor 58 differentiates the square wave signal into a series of positive and negative spikes. The positive spikes are shunted the ground by the rectifier 59 and the rectifier 60 only passes negative spikes to the terminals 64 and 66. The number of negative spikes passed to the terminals 64 and 66 will depend upon the frequency of the input signal, there being one negative spike for each cycle of input. The amplitude and shape of these negative spikes will be constant due to the amplitude limiting action of the transistor stages and the differentiation by the capacitor 58. Hence, the total D.C. current passed to terminals 64 and 66 will depend only upon the number of negative spikes per unit time and this number will be directly proportional to the input frequency. Hence, the D.C. output from the pulse rate counter will be directly proportional to the frequency of the input signal.

The capacitor 38 is variable between 1300 and 2830 micro-microfarads to calibrate the output from the frequency meter. After the unit is constructed a steady predetermined frequency signal is fed into the pulse rate counter circuit. The capacitor 28 is then adjusted until a predetermined deflection of the meter 68 is obtained.

The collector of the transistor 49 which is the output from the third stage of the pulse rate counter circuit is connected to an output jack 74 over a 0.1 microfarad capacitor 75. This jack 74 provides an audio output for monitoring the beat note.

The audio oscillator comprises a transistor 91 of the P-N-P type. The collector of this transistor is connected to a negative terminal of a 6 volt battery 92. A switch 93 connects the positive terminal of the battery 92 to ground. The emitter of the transistor 91 is connected to one of the terminals of a first winding 94 of a transformer 117. The midtap of the winding 94 is connected to ground and the other terminal of the winding is connected to ground through a potentiometer 95. The movable contact of the potentiometer 95 is the output for the audio signal generated by the oscillator and is connected to the rectifier 90 to provide the R.M.S. calibration. The emitter is also connected to the base by a second winding 118 of the transformer 117, a 0.022 microfarad capacitor 98, and a resistor 97 in series. A 2 microfarad capacitor 96 shunts the capacitor 98 and the winding 118. A 820 ohm resistor 99 connects the base to the collector. The transformer winding 118 is connected so as to provide positive feedback to the base of the transistor 91 and thus will cause the circuit to oscillate. The variable contact on the potentiometer 95 can be adjusted until the 1.5 R.M.S. standard is obtained. This standard can be determined by means of the meter 68 as explained above.

The above description and drawing is presented for the purpose of presenting a specific embodiment. It is to be understood that numerous modifications could be made to this embodiment without departing from the spirit and scope of the invention which is to be limited only as defined in the appended claim.

I claim:

A frequency meter comprising an oscillator, said oscillator including a vacuum tube having a fast warm-up time, said vacuum tube including a plate, a cathode, a control grid and a screen grid, a first source of voltage, a first inductor coupling said first source of voltage to said plate, a second source of voltage, a second inductor coupled between said second source of voltage and said cathode, a frequency adjust capacitor connected across said second inductor, a second capacitor coupled between said grid and the junction of said second inductor and said frequency adjust capacitor, a feedback circuit coupled between said screen grid and said control grid, a plurality of crystals, means to selectively switch any one of said plurality of crystals into said feedback circuit, means coupled to said plate to tune the plate circuit of said vacuum tube continuously variable over a range including the second harmonics of all of said plurality of crystals, means coupled to said plate to mix the signal generated by said oscillator with a signal of which the frequency is to be measured to generate a beat frequency, said means to mix including a half-wave rectifier, means to apply the signal of which the frequency is to be measured to said half-wave rectifiers simultaneously with the signal generated by said oscillator, means coupled to said plate circuit to produce a direct current output proportional to said beat frequency, means coupled to said means to produce direct current to indicate direct current amplitudes, and means coupled to said means to indicate for selectively coupling said indicating means either to said means to produce a direct current or to the output to said half-wave rectifier.

(References on following page)

References Cited in the file of this patent

UNITED STATES PATENTS

| Number | Name | Date |
|---|---|---|
| 2,232,858 | Lane | Feb. 25, 1941 |
| 2,235,169 | Roberts | Mar. 8, 1941 |
| 2,324,797 | Norton | July 20, 1943 |
| 2,337,328 | Hathaway | Dec. 21, 1943 |
| 2,393,856 | Collins | Jan. 29, 1946 |
| 2,455,824 | Tellier | Dec. 7, 1948 |
| 2,469,829 | Kinzer | May 10, 1949 |
| 2,491,494 | Grimm | Dec. 20, 1949 |
| 2,506,762 | Antalek | May 9, 1950 |
| 2,520,867 | Werner | Aug. 29, 1950 |
| 2,647,237 | Herbst | July 28, 1953 |
| 2,685,648 | Budelman | Aug. 3, 1954 |
| 2,856,585 | Gibbons | Oct. 14, 1958 |
| 2,859,360 | Suran | Nov. 4, 1958 |
| 2,878,448 | Maxey | Mar. 17, 1959 |
| 2,900,601 | Corl et al. | Aug. 18, 1959 |

FOREIGN PATENTS

| Number | Country | Date |
|---|---|---|
| 23,650/35 | Australia | July 24, 1935 |

OTHER REFERENCES

"A Heterodyne Frequency Meter for 10 to 3,000 Mcs.," article in General Radio Experimenter, July and August 1945, copyright 1945, General Radio Company, Cambridge, Massachusetts, pages 2 and 3.

"Electronic Frequency Meters," article in Journal of Scientific Instruments, volume 26, No. 9, September 1949, page 310.

"Impedance Inverting Pierce Oscillator," Wright Air Development Center Report, 54–248, Handbook of Piezselectric Xtals for Radio Equipment, Designers, December 1954, page 279.

"Battery Operated Direct Reading Audio-Frequency Meter," article in The Cornell-Dubilier Capacitor published by Cornell-Dubilier Electric Corp., Hamilton Boulevard, S. Plainfield, New Jersey, volume 21, No. 2, February 1956, page 3.